(12) United States Patent
Lee et al.

(10) Patent No.: US 10,955,698 B2
(45) Date of Patent: Mar. 23, 2021

(54) COLOR CONVERSION PANEL, DISPLAY DEVICE INCLUDING THE SAME, AND METHOD OF MANUFACTURING THE SAME

(71) Applicant: SAMSUNG DISPLAY CO., LTD., Suwon-si (KR)

(72) Inventors: Hee-Keun Lee, Suwon-si (KR); Yeogeon Yoon, Suwon-si (KR); Jangsoo Kim, Asan-si (KR); Wontae Kim, Suwon-si (KR); Hoon Kim, Suwon-si (KR); Seung-Jin Chu, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 95 days.

(21) Appl. No.: 16/121,383

(22) Filed: Sep. 4, 2018

(65) Prior Publication Data

US 2019/0235311 A1  Aug. 1, 2019

(30) Foreign Application Priority Data

Feb. 1, 2018 (KR) .......................... 10-2018-0012993

(51) Int. Cl.
*G02F 1/1335* (2006.01)
*G02F 1/13357* (2006.01)
*G02F 1/1368* (2006.01)

(52) U.S. Cl.
CPC .. *G02F 1/133516* (2013.01); *G02F 1/133512* (2013.01); *G02F 1/133617* (2013.01);
(Continued)

(58) Field of Classification Search
CPC ......... G02F 1/133514; G02F 1/133617; G02F 1/134309; G02F 1/1393; G02F 1/13718;
(Continued)

(56) References Cited

U.S. PATENT DOCUMENTS 9,651,724 B2   5/2017 Cross et al.
9,720,149 B2   8/2017 Wu et al.
(Continued)

FOREIGN PATENT DOCUMENTS

KR   102006112157   10/2006
KR   1020080038602   5/2008
(Continued)

*Primary Examiner* — Hoan C Nguyen
(74) *Attorney, Agent, or Firm* — F. Chau & Associates, LLC

(57) ABSTRACT

A color conversion panel includes a substrate that includes first to third pixel areas, a first color conversion layer on the substrate in the first pixel area that converts incident light into first color light, a second color conversion layer on the substrate in the second pixel area that converts the incident light into second color light, a first color filter layer between the substrate and the first color conversion layer that has the first color and blocks incident light not converted by the first color conversion layer, a second color filter layer between the substrate and the second color conversion layer that has a third color and blocks incident light not converted by the second color conversion layer, and a light shielding layer on the substrate between the second and the third pixel areas that has the first color.

17 Claims, 15 Drawing Sheets

(52) U.S. Cl.
CPC ...... *G02F 1/1368* (2013.01); *G02F 1/133514* (2013.01); *G02F 2001/133519* (2013.01); *G02F 2202/108* (2013.01)

(58) Field of Classification Search
CPC ........... G02F 1/133512; G02F 2203/00; G02F 1/133516; G02F 2202/108; G02F 1/1368; G02F 2001/133519
See application file for complete search history.

(56) References Cited

U.S. PATENT DOCUMENTS

| | | | | |
|---|---|---|---|---|
| 2012/0287523 | A1* | 11/2012 | Wu | G02B 5/201 |
| | | | | 359/891 |
| 2015/0048348 | A1* | 2/2015 | Huang | H01L 27/322 |
| | | | | 257/40 |
| 2016/0093677 | A1* | 3/2016 | Tseng | G02B 5/201 |
| | | | | 362/84 |
| 2017/0176816 | A1* | 6/2017 | Han | G03F 7/0007 |
| 2017/0343859 | A1* | 11/2017 | Chen | G02B 5/201 |
| 2018/0029072 | A1* | 2/2018 | Li | G02F 1/1335 |
| 2018/0113356 | A1* | 4/2018 | Lee | G02F 1/133514 |
| 2018/0156951 | A1* | 6/2018 | Baek | G02F 1/133617 |
| 2018/0157098 | A1* | 6/2018 | Choung | G02F 1/133516 |

FOREIGN PATENT DOCUMENTS

| | | |
|---|---|---|
| KR | 1020080056582 | 6/2008 |
| KR | 10-1129434 | 3/2012 |
| KR | 1020150116022 | 10/2015 |
| KR | 1020170032503 | 3/2017 |

\* cited by examiner

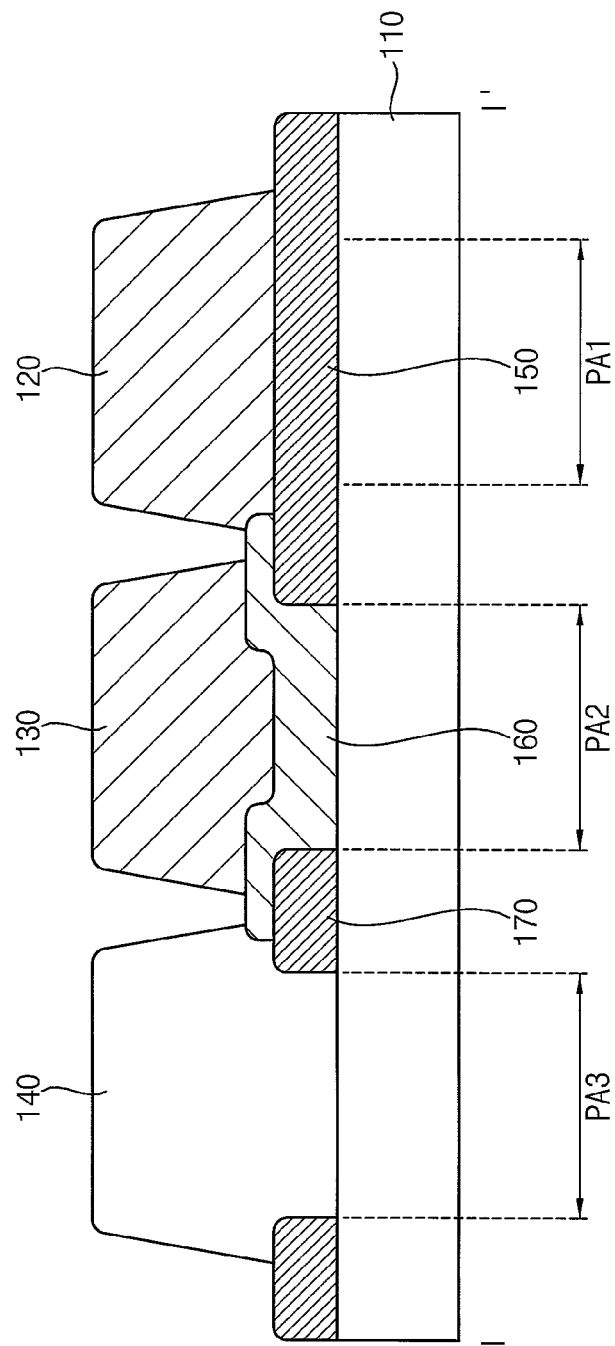

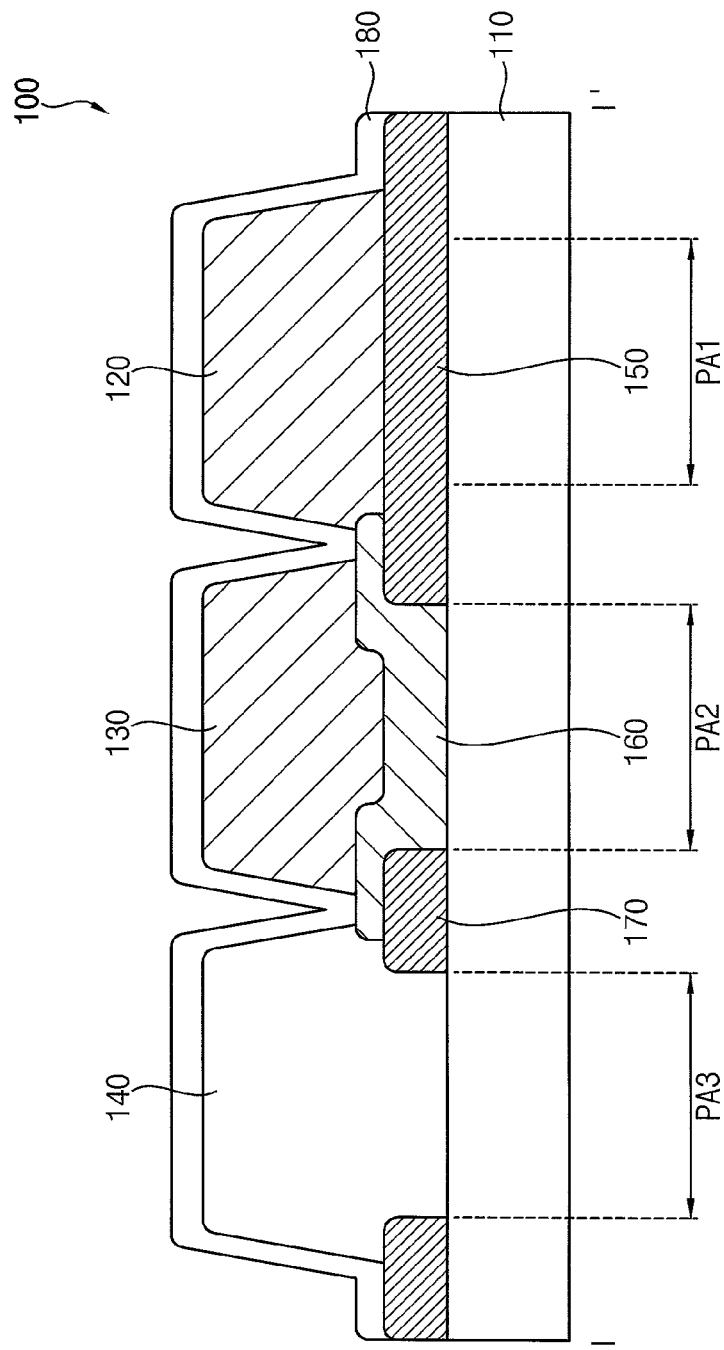

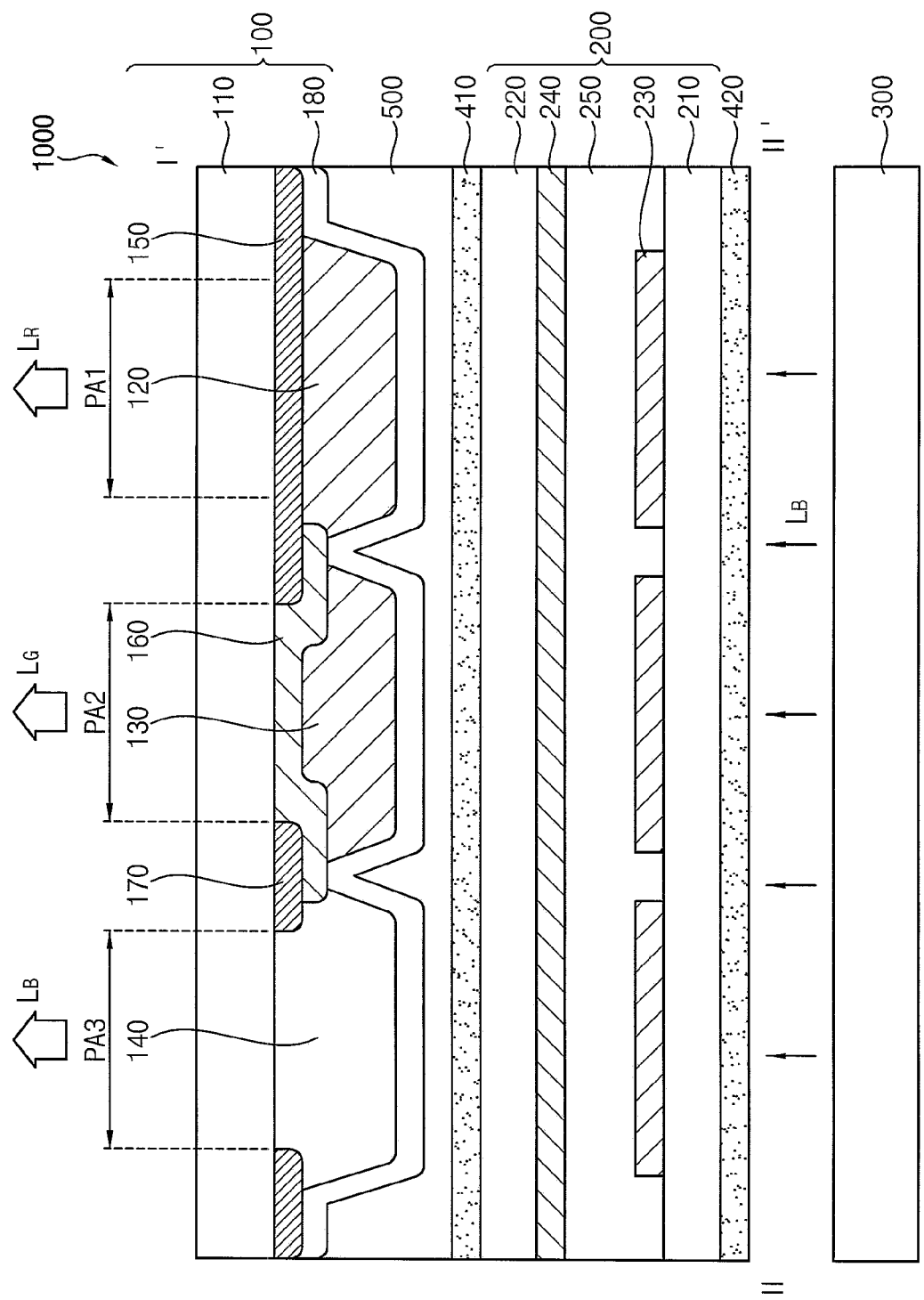

COLOR CONVERSION PANEL, DISPLAY DEVICE INCLUDING THE SAME, AND METHOD OF MANUFACTURING THE SAME

CROSS-REFERENCE TO RELATED APPLICATION(S)

This application claims priority under 35 U.S.C. § 119 from, and the benefit of, Korean Patent Application No. 10-2018-0012993, filed on Feb. 1, 2018 in the Korean Intellectual Property Office (KIPO), the contents of which are herein incorporated by reference in their entirety.

BACKGROUND

1. Technical Field

Embodiments are directed to a display device. More particularly, embodiments are directed to a color conversion panel, a display device that includes the color conversion panel, and a method of manufacturing the color conversion panel.

2. Description of the Related Art

A liquid crystal display (LCD) device is one type of flat panel display devices that is currently widely used. A liquid crystal display device includes electric field generating electrodes, such as a pixel electrode and a common electrode, and a liquid crystal layer formed therebetween. A voltage is applied to the electric field generating electrodes to generate an electric field in the liquid crystal layer, thereby determining an orientation of liquid crystal molecules of the liquid crystal layer and controlling polarization of incident light to display an image.

A liquid crystal display device uses color filters to impart color, and thus has low light efficiency since the amount of light emitted from a backlight source is reduced to about one third (⅓) after the light passes through a red color filter, a green color filter, and a blue color filter.

A photo-luminescent liquid crystal display (PL-LCD) device, useful for high color reproducibility and to compensate for such a low light efficiency, is a liquid crystal display device in which a conventional color filter is replaced by a quantum dot color conversion layer (QD-CCL). A PL-LCD device displays a color image using visible light generated when light in a short wavelength band, such as ultraviolet (UV) light or blue light, generated from a light source and controlled by a liquid crystal layer irradiates a color conversion layer (CCL).

SUMMARY

Embodiments of the present disclosure can provide a color conversion panel that is not visibly yellowish.

Embodiments of the present disclosure can provide a display device that is not visibly yellowish.

Embodiments of the present disclosure can provide a method of manufacturing a color conversion panel in which a manufacturing process is simplified thereby reducing manufacturing cost and manufacturing time.

According to an embodiment of the present disclosure, there is provided a color conversion panel, including: a substrate that includes a first pixel area, a second pixel area, and a third pixel area, a first color conversion layer disposed on the substrate in the first pixel area, the first color conversion layer including a plurality of quantum dots that convert an incident light into a first color light, a second color conversion layer disposed on the substrate in the second pixel area, the second color conversion layer including a plurality of quantum dots that convert the incident light into a second color light, a first color filter layer disposed between the substrate and the first color conversion layer, where the first color filter layer has the first color and blocks incident light not converted by the first color conversion layer, a second color filter layer disposed between the substrate and the second color conversion layer, where the second color filter layer has a third color and blocks incident light not converted by the second color conversion layer, and a light shielding layer disposed on the substrate between the second pixel area and the third pixel area, where the light shielding layer has the first color.

In an embodiment, a portion of the first color filter layer may be disposed on the substrate between the first pixel area and the second pixel area. A first portion of the second color filter layer may be disposed on the substrate between the first pixel area and the second pixel area. A second portion of the second color filter layer may be disposed on the substrate between the second pixel area and the third pixel area.

In an embodiment, the third color may differ from the second color.

In an embodiment, the third color may be substantially the same as the second color.

In an embodiment, the first color may be red, and the second color may be green, and the third color may be one of yellow or green.

In an embodiment, a thickness of the first color filter layer may be substantially the same as a thickness of the light shielding layer.

In an embodiment, the color conversion panel may further include a transmitting layer disposed on the substrate in the third pixel area, where the transmitting layer transmits the incident light.

In an embodiment, a thickness of the first color filter layer may range from about 20% to about 30% of a thickness of the transmitting layer.

In an embodiment, a thickness of the first color filter layer may range from about 15% to about 20% of a thickness of the transmitting layer.

In an embodiment, the color conversion panel may further include a capping layer disposed on the first color conversion layer and the second color conversion layer. The capping layer reflects first color light and second color light.

In an embodiment, the color conversion panel may further include a backlight unit that emits the incident light, and a liquid crystal panel disposed on the backlight unit. The color conversion panel may be disposed on the liquid crystal panel, and the incident light emitted by the backlight unit may be blue.

According to an embodiment of the present disclosure, there is provided a color conversion panel, including: a substrate that includes a first pixel area, a second pixel area, and a third pixel area; a first color conversion layer disposed on the substrate in the first pixel area, wherein the first color conversion layer includes a plurality of quantum dots that convert an incident light into a first color light; a second color conversion layer disposed on the substrate in the second pixel area, wherein the second color conversion layer includes a plurality of quantum dots that convert the incident light into a second color light having a second color; a first color filter layer disposed between the substrate and the first color conversion layer, wherein the first color filter layer has the first color and blocks incident light that is not converted by the first color conversion layer; a second color filter layer disposed between the substrate and the second color conversion layer, wherein the second color filter layer has a third color and blocks incident light that is not converted by the second color conversion layer; and a transmitting layer disposed on the substrate in the third pixel area, wherein the transmitting layer transmits the incident light.

In an embodiment, the color conversion panel may further include a light shielding layer disposed on the substrate between the second pixel area and the third pixel area. The light shielding layer may have the first color, and a thickness of the first color filter layer may be the same as a thickness of the light shielding layer.

In an embodiment, a portion of the first color filter layer may be disposed on the substrate between the first pixel area and the second pixel area. A first portion of the second color filter layer may be disposed on the substrate between the first pixel area and the second pixel area, and a second portion of the second color filter layer may be disposed on the substrate between the second pixel area and the third pixel area.

In an embodiment, the first color may be red, the second color may be green, and the third color may be one of green or yellow.

In an embodiment, a thickness of the first color filter layer may be less than 30% of a thickness of the transmitting layer.

In an embodiment, the color conversion panel may further include a capping layer disposed on the first color conversion layer and the second color conversion layer, where the capping layer reflects first color light and second color light.

According to an embodiment of the present disclosure, a method of manufacturing a color conversion panel includes forming a first color filter layer on a substrate in a first pixel area, the first color filter layer having a first color, forming a light shielding layer on the substrate between a second pixel area and a third pixel area, the light shielding layer having the first color, forming a second color filter layer on the substrate in the second pixel area, the second color filter layer having a second color, forming a first color conversion layer on the first color filter layer, the first color conversion layer including a plurality of quantum dots that convert an incident light into a first color light, and forming a second color conversion layer on the second color filter layer, the second color conversion layer including a plurality of quantum dots that convert the incident light into a third color light In an embodiment, the first color filter layer and the light shielding layer may be substantially simultaneously formed.

In an embodiment, the method may further include forming a transmitting layer on the substrate in the third pixel area, wherein the transmitting layer transmits the incident light, and forming a capping layer on the first color conversion layer and the second color conversion layer, where the capping layer reflects first color light and second color light.

A color conversion panel according to embodiments includes a red first color filter layer and a red light shielding layer, so that a combined red, blue and yellow (or green) reflective light is emitted from the color conversion panel when external light is reflected by the color conversion panel. Accordingly, the color conversion panel is not visibly yellowish.

A display device according to embodiments includes a color conversion panel that includes a red first color filter layer and a red light shielding layer, so that a combined red, blue and yellow (or green) reflective light is emitted from the display device when external light is reflected by the display device. Accordingly, the display device is not visibly yellowish.

In the method of manufacturing the color conversion panel according to the embodiments, a red first color filter layer and a red light shielding layer are substantially simultaneously formed, so that no additional process for forming the first color filter is required, and a manufacturing cost and a manufacturing time of the color conversion panel can be reduced.

BRIEF DESCRIPTION OF THE DRAWINGS

FIGS. 9A, 9B, 9C, and 9D are cross-sectional views that illustrate a method of manufacturing a color conversion panel according to an embodiment.

FIG. 11 is a cross-sectional view of a display device in FIG. 10 cut along a line II-II'.

DETAILED DESCRIPTION OF EXEMPLARY EMBODIMENTS

Hereinafter, color conversion panels, display devices, and methods of manufacturing color conversion panels in accordance with embodiments of the present disclosure will be explained in detail with reference to the accompanying drawings.

Figure 1:
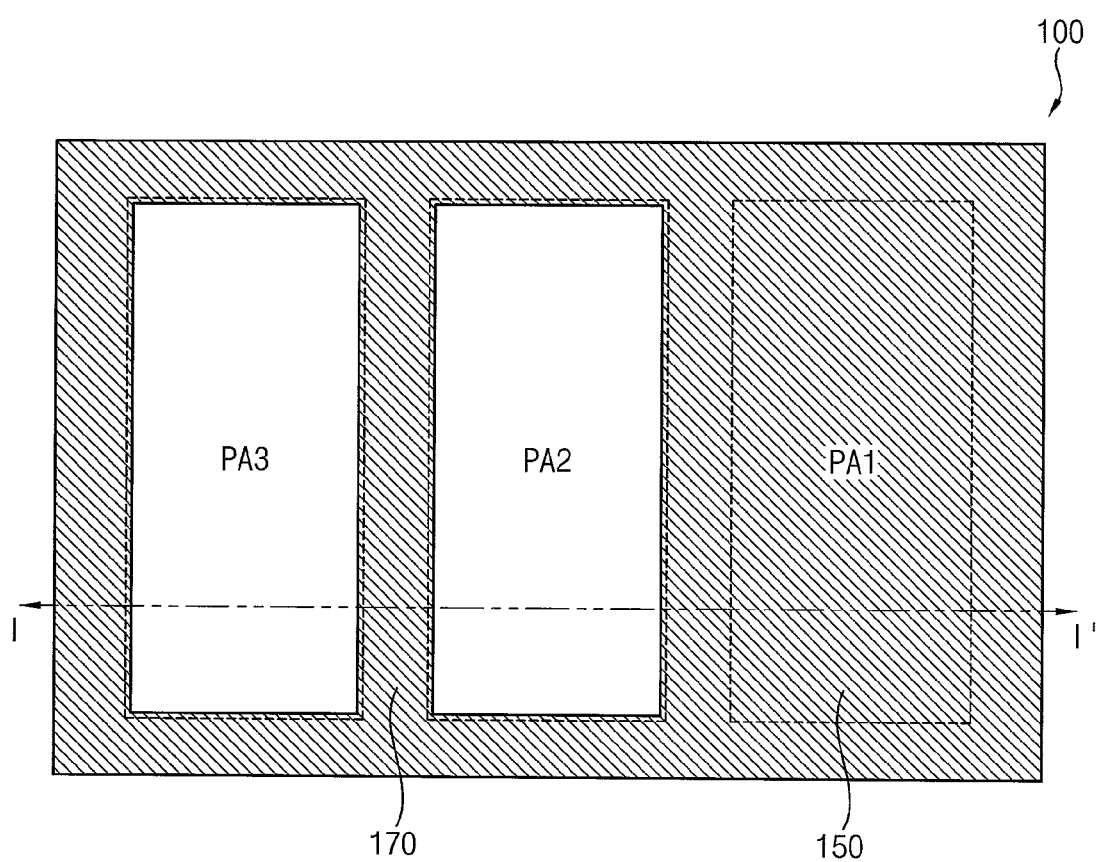
FIG. 1 is a plan view of a color conversion panel according to an embodiment.
Figure 2:
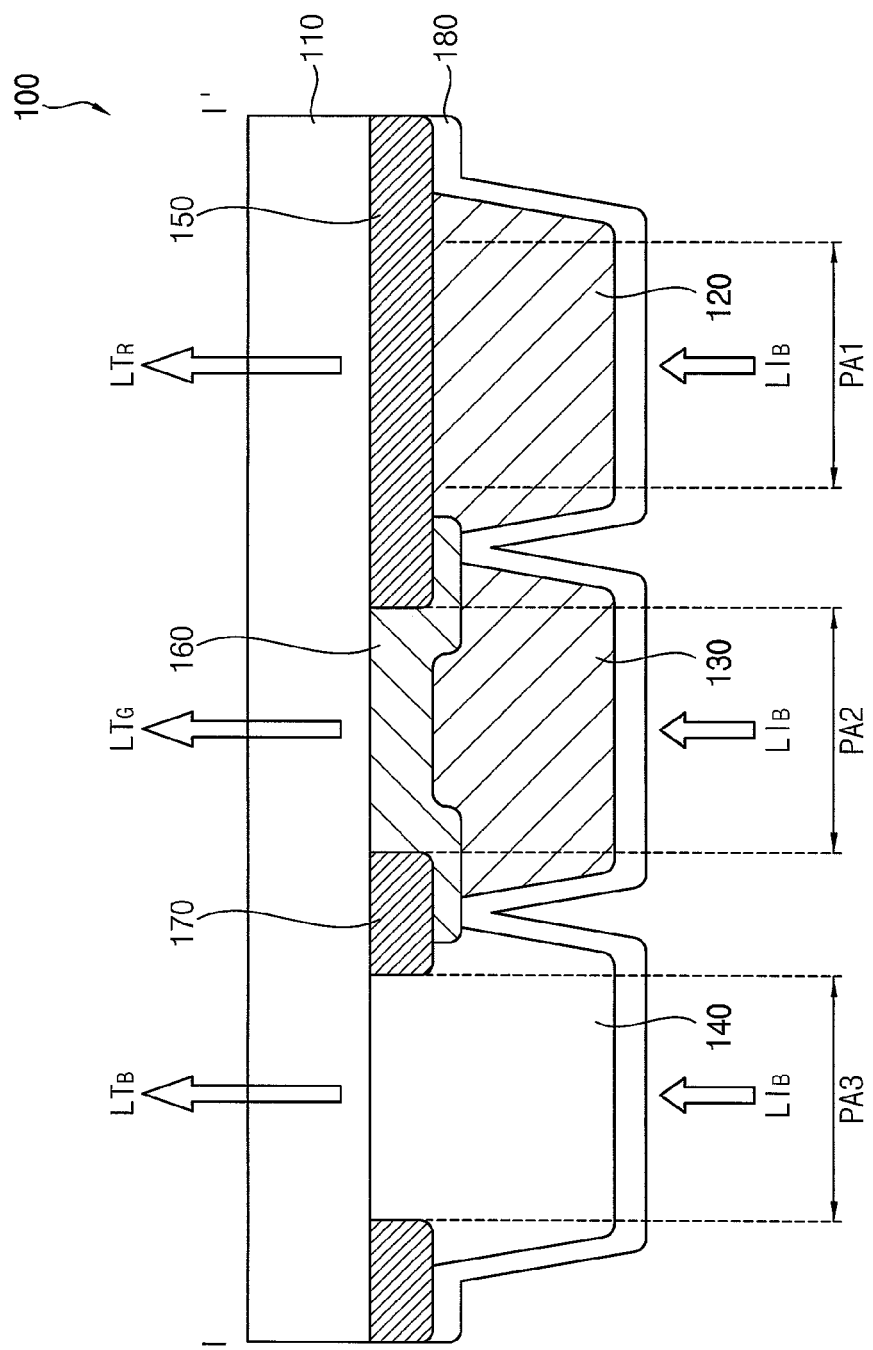
FIG. 2 is a cross-sectional view of a color conversion panel in FIG. 1 cut along a line I-I'.

FIG. 1 is a plan view of a color conversion panel according to an embodiment. FIG. 2 is a cross-sectional view of a color conversion panel in FIG. 1 cut along a line I-I'.

Referring to FIGS. 1 and 2, a color conversion panel 100 according to an embodiment includes a substrate 110, a first color conversion layer 120, a second color conversion layer 130, a transmitting layer 140, a first color filter layer 150, a second color filter layer 160, a light shielding layer 170, and a capping layer 180.

According to an embodiment, the substrate 110 includes a first pixel area PA1, a second pixel area PA2, and a third pixel area PA3 that generate different colors. When light $LI_B$ is incident onto the color conversion panel 100, converted lights $LT_R$, $LT_G$, and $LT_B$ that have colors that differ from each other are emitted from the first, second, and third pixel areas PA1, PA2, and PA3, respectively. For example, the incident light $LI_B$ is blue light, and the converted lights $LT_R$, $LT_G$, and $LT_B$ are red light, green light, and blue light.

According to an embodiment, a first color conversion layer 120 is disposed on the substrate 110 in the first pixel area PA1. The first color conversion layer 120 includes a plurality of quantum dots that convert the incident light $LI_B$ into light having a first color. For example, the first color is red. The first color conversion layer 120 converts the incident light LIE into a first converted light $LT_R$ that have a wavelength longer than a wavelength of the incident light $LI_B$, and emits the first converted light $LT_R$. For example, the first color conversion layer 120 includes quantum dots that absorb blue light and emit red light.

According to an embodiment, a second color conversion layer 130 is disposed on the substrate 110 in the second pixel area PA2. The second color conversion layer 130 includes a plurality of quantum dots that convert the incident light $LI_B$ into light having a second color. Here, the second color differs from the first color. For example, the second color is green. The second color conversion layer 130 converts the incident light $LI_B$ into a second converted light $LT_G$ that has a wavelength longer than a wavelength of the incident light $LI_B$, and emits the second converted light $LT_G$. For example, the second color conversion layer 130 includes quantum dots that absorb blue light and emit green light.

According to an embodiment, each of the quantum dots included in the first and second color conversion layers 120 and 130 includes a nanocrystalline material, such as a silicon-based nanocrystal, a group II-VI-based compound semiconductor nanocrystal, a group III-V-based compound semiconductor nanocrystal, a group IV-VI-based compound semiconductor nanocrystal, or a mixture thereof. The group II-VI-based compound semiconductor nanocrystal includes at least one selected from CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, CdZnSeS, CdZnSeTe, CdZnSTe, CdHgSeS, CdHgSeTe, CdHgSTe, HgZnSeS, HgZnSeTe, or HgZnSTe. The group III-V-based compound semiconductor nanocrystal includes at least one selected from GaN, GaP, GaAs, AlN, AlP, AlAs, InN, InP, InAs, GaNP, GaNAs, GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, or InAlPAs. The group IV-VI-based compound semiconductor nanocrystal includes SbTe.

According to an embodiment, even if the quantum dots included in the first and second color conversion layers 120 and 130 include the same material, light emitted from the respective first and second color conversion layers 120 and 130 can have different wavelengths, depending on the sizes of the quantum dots of the first and second color conversion layers 120 and 130. For example, smaller sized quantum dots emit shorter wavelengths of light. Accordingly, light of different visible colors can be emitted by adjusting sizes of the quantum dots of the first and second color conversion layers 120 and 130.

In an embodiment, when the first and second converted lights $LT_R$ and $LT_G$ emitted from the first and second color conversion layers 120 and 130 are red and green, respectively, the materials of the quantum dots of the first and second color conversion layers 120 and 130 can be the same, but the sizes of the quantum dots of the first color conversion layer 120 are greater than the sizes of the quantum dots of the second color conversion layer 130.

According to an embodiment, a transmitting layer 140 is disposed on the substrate 110 in the third pixel area PA3. The transmitting layer 140 transmits the incident light $LI_B$. The transmitting layer 140 does not convert the incident light $LI_B$, and emits a third converted light $LT_B$ substantially the same as the incident light $LI_B$. For example, blue light incident into the third pixel area PA3 is emitted without conversion thereof.

According to an embodiment, the transmitting layer 140 includes dispersion material that disperses the incident light $LI_B$. For example, the transmitting layer 140 includes one of $TiO_2$, $ZrO_2$, $Al_2O_3$, $In_2O_3$, $ZnO$, $SnO_2$, $Sb_2O_3$, or ITO.

However, the dispersion materials of the transmitting layer 140 are not limited thereto. The transmitting layer 140 can include various materials as long as the material does not convert, but simply disperses, blue light.

According to an embodiment, the first color filter layer 150 is disposed between the substrate 110 and the first color conversion layer 120. The first color filter layer 150 blocks incident light $LI_B$ that is not converted by the first color conversion layer 120. For example, the first color filter layer 150 transmits red light that is emitted by the first color conversion layer 120, and blocks blue light that is not converted by the first color conversion layer 120.

According to an embodiment, the color of the first color filter layer 150 is the first color. For example, the first color is red. Accordingly, the first color filter layer 150 has the same color as the first converted light $LT_R$ that is emitted by the first color conversion layer 120. A red first color filter layer 150 transmits red first converted light $LT_R$. Accordingly, the first converted light $LT_R$ is not blocked by the first color filter layer 150, and is emitted by the color conversion panel 100.

According to an embodiment, the second color filter layer 160 is disposed between the substrate 110 and the second color conversion layer 130. The second color filter layer 160 blocks incident light $LI_B$ that is not converted by the second color conversion layer 130. For example, the second color filter layer 160 transmits green light that is emitted by the second color conversion layer 130, and blocks blue light that is not converted by the second color conversion layer 130.

According to an embodiment, the second color filter layer 160 can be a third color. Here, the third color differs from the first color and the second color. For example, the third color is yellow. Accordingly, the color of the second color filter layer 160 can differ from the color of the second converted light $LT_G$ emitted by the second color conversion layer 130. A yellow second color filter layer 160 transmits green second converted light $LT_G$. Accordingly, the second converted light $LT_G$ is blocked by the second color filter layer 160, and is emitted by the color conversion panel 100.

According to an embodiment, the first color filter layer 150 and the second color filter layer 160 selectively transmit light emitted from the first color conversion layer 120 and the second color conversion layer 130, respectively. Accordingly, the first and second color filter layers 150 and 160 improve color reproduction of the color conversion panel 100.

According to an embodiment, a portion of the first color filter layer 150 is disposed on the substrate 110 between the first pixel area PA1 and the second pixel area PA2. For example, the first color filter layer 150 substantially covers the first pixel area PA1 and a peripheral region of the second pixel area PA2. The first color filter layer 150 prevents color mixing between the first converted light $LT_R$ and the second converted light $LT_G$. Accordingly, the first color filter layer 150 functions as a light shielding member that prevents color mixing between the first pixel area PA1 and the second pixel area PA2 as well as a color filter that selectively blocks incident light $LI_B$ not converted by the first color conversion layer 120.

According to an embodiment, the light shielding layer 170 is disposed on the substrate 110 between the second pixel area PA2 and the third pixel area PA3. For example, the light shielding layer 170 substantially covers a peripheral region of the second pixel area PA2 and a peripheral region of the third pixel area PA3. The light shielding layer 170 prevent color mixing between the second converted light $LT_G$ and the third converted light $LT_B$. The color of the light shielding layer 170 is the first color. For example, the first color is red. Accordingly, the light shielding layer 170 has the same color as the first color filter layer 150.

According to an embodiment, a first portion of the second color filter layer 160 is disposed on the substrate 110 between the first pixel area PA1 and the second pixel area PA2, and a second portion of the second color filter layer 160 is disposed on the substrate 110 between the second pixel area PA2 and the third pixel area PA3. The first portion of the second color filter layer 160 prevents color mixing between the first converted light $LT_R$ and the second converted light $LT_G$, and the second portion of the second color filter layer 160 prevents color mixing between the second converted light $LT_G$; and the third converted light $LT_B$. Accordingly, the second color filter layer 160 functions as a light shielding member that prevents color mixing between the first pixel area PA1 and the second pixel area PA2 and color mixing between the second pixel area PA2 and the third pixel area PA3 as well as a color filter that selectively blocks incident light $LI_B$ not converted by the second color conversion layer 130.

Figure 3A:
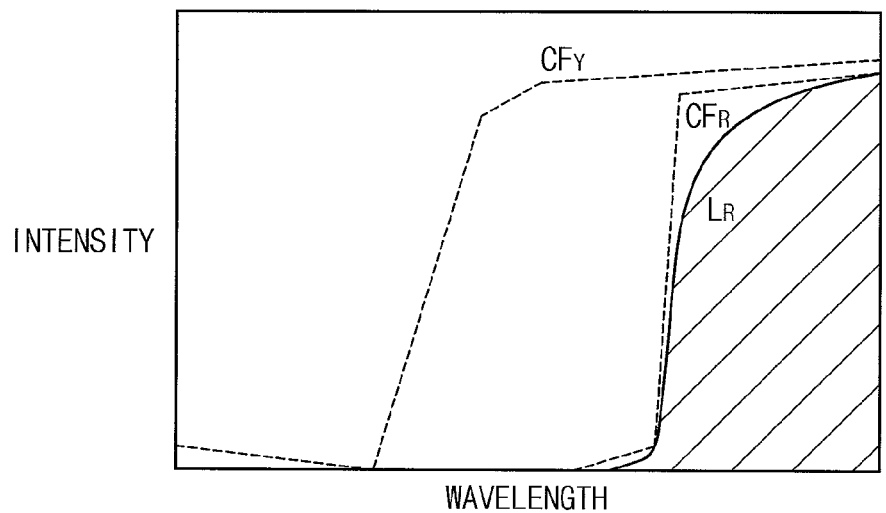
FIGS. 3A, 3B, and 3C are graphs of light spectra reflected by a color conversion panel in FIG. 2.
Figure 3B:
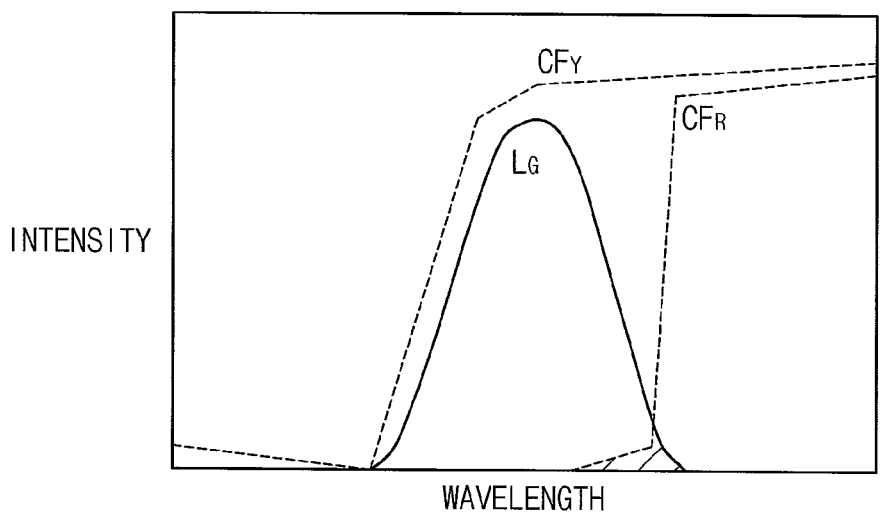
Figure 3C:
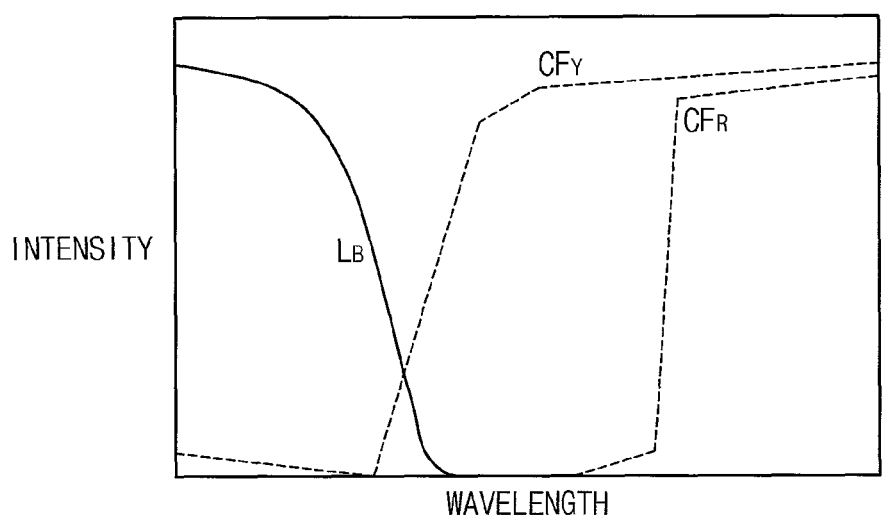

FIGS. 3A, 3B, and 3C are graphs of light spectra reflected by the color conversion panel 100 in FIG. 2. FI. 3A illustrates red light $L_R$ incident onto a combination of a red filter $CF_R$ and a yellow filter $CF_Y$, FIG. 3B illustrates green light $L_G$ incident onto a combination of a red filler $CF_R$ and a yellow filter $CF_Y$, and FIG. 3C illustrates blue light $L_B$ incident onto a combination of a red filter $CF_R$ and a yellow filter $CF_Y$.

Referring to FIGS. 3A and 3B, according to an embodiment, most of the red light $L_R$ incident onto the combination of the red filter $CF_R$ and the yellow filter $CF_Y$ propagates through the combination of the red filter $CF_R$ and the yellow filter $CF_Y$, and most of the green light $L_G$ incident onto the combination of the red filter $CF_R$ and the yellow filter $CF_Y$ is blocked by the combination of the red filter $CF_R$ and the yellow filter $CF_Y$. Accordingly, when the first color filter layer 150 is red, the second color filter layer 160 is yellow, and the second converted light $LT_G$ is green, the second converted light $LT_G$ is blocked by a combination of the portion of the first color filter layer 150 and the first portion of the second color filter layer 160 between the first pixel area PA1 and the second pixel area PA2.

Referring to FIGS. 3B and 3C, according to an embodiment, most of the green light $L_G$ incident onto the combination of the red filter $CF_R$ and the yellow filter $CF_Y$ is blocked by the combination of the red filter $CF_R$ and the yellow filter $CF_Y$, and most of the blue light $L_B$ incident onto the combination of the red filter $CF_R$ and the yellow filter $CF_Y$ is blocked by the combination of the red filter $CF_R$ and the yellow filter $CF_Y$. Accordingly, when the light shielding layer 170 is red, the second color filler layer 160 is yellow, the second converted light $LT_G$ is green, and the third converted light $LT_B$ is blue, the second converted light $LT_G$ and the third converted light $LT_R$ is blocked by a combination of the light shielding layer 170 and the second portion of the second color filter layer 160 between the second pixel area PA2 and the third pixel area PA3.

Referring to FIGS. 1 and 2 again, according to an embodiment, a thickness of the first color filter layer 150 is substantially the same as a thickness of the light shielding layer 170. For example, the thickness of the first color filter layer 150 and the thickness of the light shielding layer 170 are less than about 2 micrometers (µm). Further, a thickness of the second color filter layer 160 is less than or substantially equal to the thickness of the first color filter layer 150.

In an embodiment, the thickness of the first color filter layer 150 ranges from about 20% to about 30% of a thickness of the transmitting layer 140. For example, the thickness of the transmitting layer 140 is about 6 µm. When the thickness of the first color filter layer 150 is less than about 20% of the thickness of the transmitting layer 140, the first color filter layer 150 does not sufficiently block incident light $LI_B$ not converted by the first color conversion layer 120. Further, when the thickness of the first color filter layer 150 is greater than about 30% of the thickness of the transmitting layer 140, reflection of external light by the first color filter layer 150 increases, and the color conversion panel 100 becomes visibly reddish.

According to an embodiment, a width of the first color filter layer 150 is greater than a width of the light shielding layer 170. For example, the width of the first color filter layer 150 is less than about 300 µm, and the width of the light shielding layer 170 is less than about 30 µm.

According to an embodiment, the capping layer 180 is disposed on the first color conversion layer 120 and the second color conversion layer 130. For example, the capping layer 180 substantially covers the first color conversion layer 120, the second color conversion layer 130, and the transmitting layer 140. The capping layer 180 has a filter that prevents damage to and quenching of the quantum dots included in the first color conversion layer 120 and the second color conversion layer 130 during high temperature processes after the first color conversion layer 120 and the second color conversion layer 130 are formed. Further, the capping layer 180 is a filter that transmits light of a predetermined wavelength and reflects or absorbs light other than the predetermined wavelength. For example, the capping layer 180 transmits blue light, and reflects first color light, such as red light, and second color light, such as green light. Accordingly, the incident light $LI_B$ propagates through the capping layer 180 to the first color conversion layer 120 and the second color conversion layer 130, and the first converted light $LT_R$ and the second converted light $LT_G$ are reflected by the capping layer 180 and emitted through the substrate 110.

According to an embodiment, the capping layer 180 has a structure in which high refractive index inorganic films and low refractive index inorganic films are alternately stacked about 10 to 20 times. That is, the capping layer 180 has a structure in which a plurality of layers having different refractive indexes are alternately stacked. In this case, the capping layer 180 reflects or absorbs light of a specific wavelength. It transmits or reflects light of the specific wavelength by using reinforcement interference or destructive interference between the high refractive index inorganic film and the low refractive index inorganic film.

According to an embodiment, the capping layer 180 includes at least one of $TiO_2$, $SiN_x$, $SiO_x$, TiN, AlN, $Al_2O_3$, $SnO_2$, $WO_3$, or $ZrO_2$. For example, the capping layer 180 is a structure in which $SiN_x$ and $SiO_x$ are alternately stacked.

In an embodiment, the thickness of the first color filter layer 150 is greater than a thickness of the capping layer 180. For example, the thickness of the capping layer 180 is about 1.1 µm.

Figure 4:
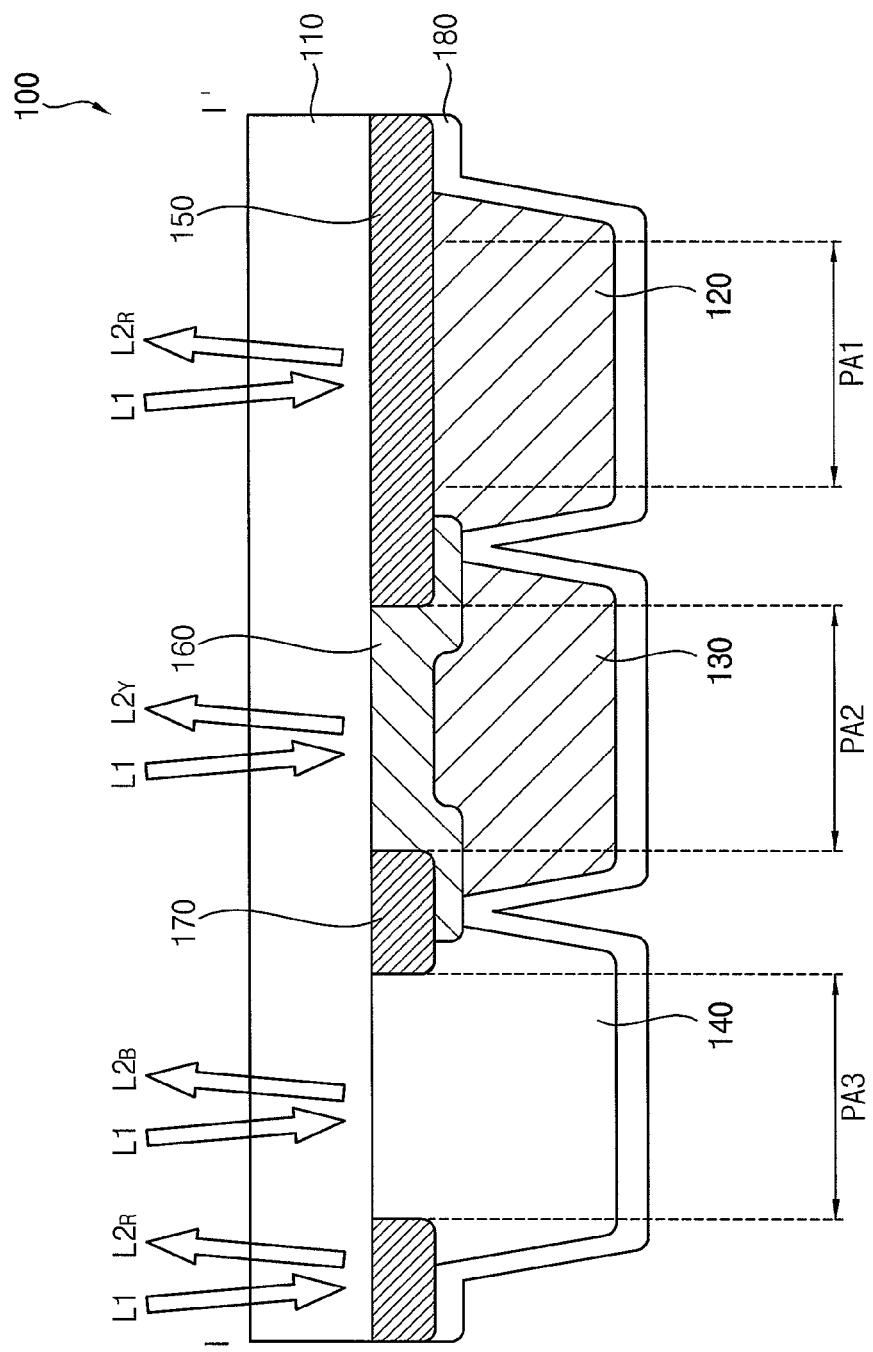
FIG. 4 is a cross-sectional view of light reflected by a color conversion panel in FIG. 2.

FIG. 4 is a cross-sectional view of light reflected by the color conversion panel 100 in FIG. 2.

Referring to FIG. 4, according to an embodiment, external light L1 is incident onto the color conversion panel 100. For example, the external light L1 is incident onto the color conversion panel 100 through the substrate 110. The external light L1 is reflected by the transmitting layer 140, the first color filter layer 150, the second color filter layer 160, and the light shielding layer 170.

According to an embodiment, when external light L1 is reflected by the red first color filter layer 150 or the red light shielding layer 170, red reflective light $L2_R$ is emitted from the color conversion panel 100. When external light L1 is reflected by the yellow second color filter layer 160, yellow reflective light $L2_Y$ is emitted from the color conversion panel 100. Further, when external light L1 is reflected by the transmitting layer 140, blue reflective light $L2_B$ is emitted from the color conversion panel 100. In this case, the combination of red reflective light $L2_R$, yellow reflective light $L2_Y$, and blue reflective light $L2_B$ is emitted from the color conversion panel 100.

According to an embodiment, a conventional color conversion panel includes a yellow color filter layer to block blue incident light not converted by the color conversion layer. When external light is reflected by the color conversion panel, substantially yellow reflective light is emitted from the color conversion panel. In this case, the color conversion panel is visibly yellowish.

The color conversion panel 100 according to a present embodiment include a red first color filter layer 150 and a red light shielding layer 170. When external light is reflected by the color conversion panel 100, a combination of red, blue and yellow reflective light is emitted from the color conversion panel 100. In this case, the color conversion panel 100 is not visibly yellowish.

Figure 5:
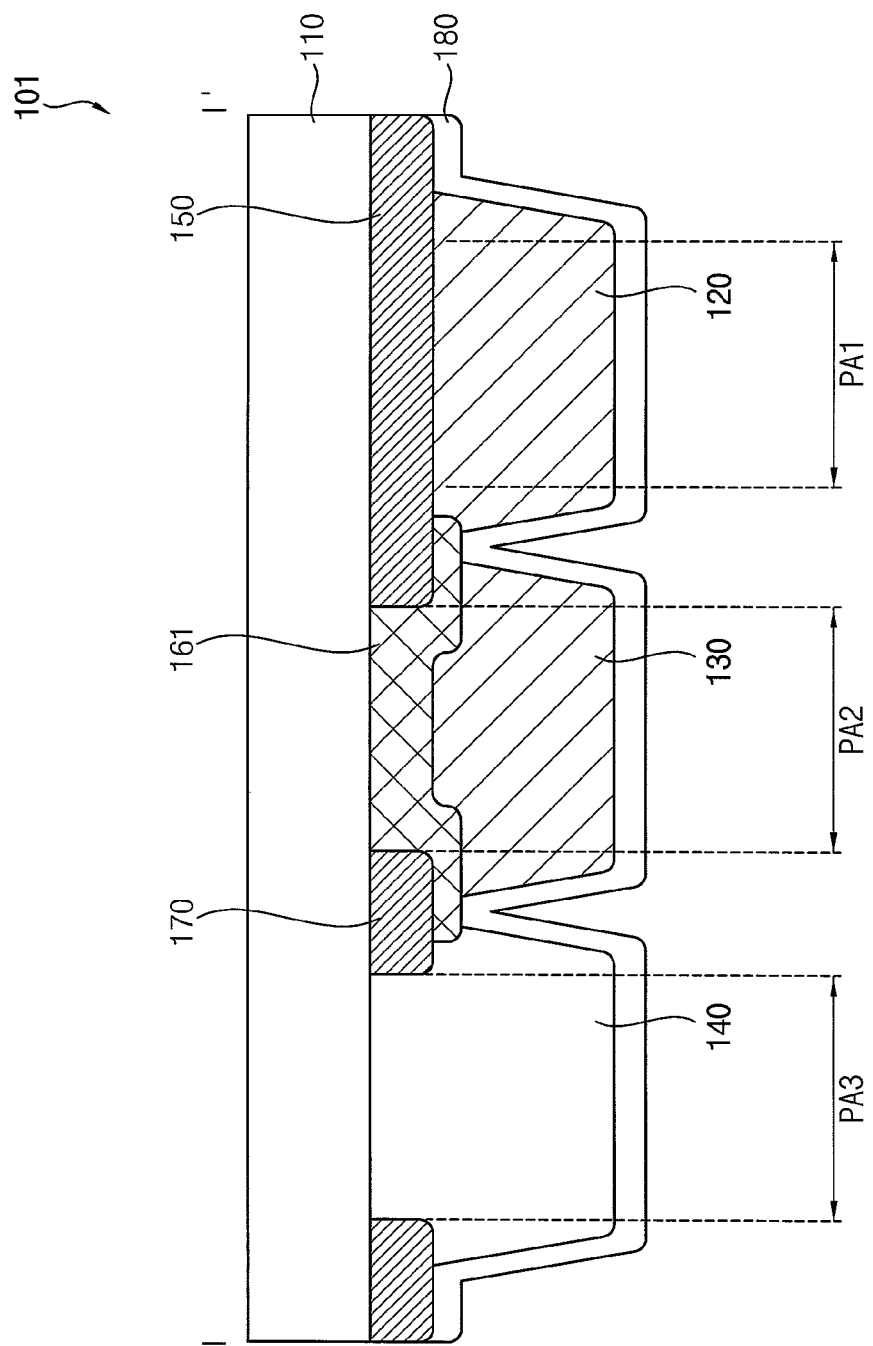
FIG. 5 is a cross-sectional view of a color conversion panel according to another embodiment.

FIG. 5 is a cross-sectional view of a color conversion panel according to an embodiment.

Referring to FIG. 5, a color conversion panel 101 according to an embodiment includes a substrate 110, a first color conversion layer 120, a second color conversion layer 130, a transmitting layer 140, a first color filter layer 150, a second color filter layer 161, a light shielding layer 170, and a capping layer 180. The color conversion panel 101 according to an embodiment described with reference to FIG. 5 is substantially similar to the color conversion panel 100 according to an embodiment described with reference to FIG. 2 except for the second color filter layer 161. Accordingly, detailed descriptions of elements of the color conversion panel 101 according to an embodiment described with reference to FIG. 5 that are substantially similar to those of the color conversion panel 100 according to an embodiment described with reference to FIG. 2 will be omitted.

According to an embodiment, the second color filter layer 161 is disposed between the substrate 110 and the second color conversion layer 130. The second color filter layer 161 blocks incident light that is not converted by the second color conversion layer 130. For example, the second color filter layer 161 transmits green light emitted by the second color conversion layer 130, and blocks blue light that is not converted by the second color conversion layer 130.

According to an embodiment, the color of the second color filter layer 161 is a third color. Here, the third color is the same as the second color. For example, the third color is green. Accordingly, the second color filter layer 161 has the same color as second converted light emitted by the second color conversion layer 130. The green second color filter layer 161 transmits green second converted light. Accordingly, the second converted light is not blocked by the second color filter layer 161 and is emitted by the color conversion panel 101.

Figure 6:
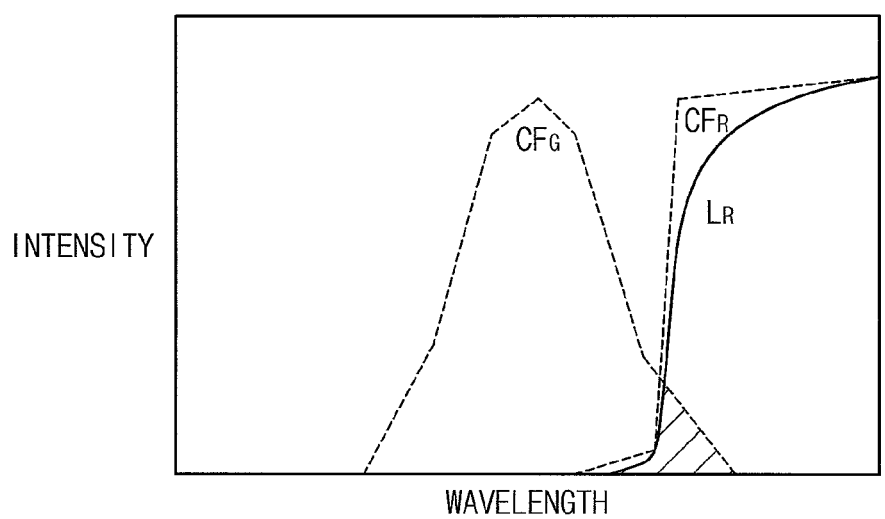
FIG. 6 is a graph of light spectra reflected by a color conversion panel in FIG. 5.

FIG. 6 is a graph of light spectra reflected by the color conversion panel 101 in FIG. 5. FIG. 6 illustrates red light $L_R$ incident onto a combination of a red filter $CF_R$ and a green filter $CF_G$.

Referring to FIG. 6, according to an embodiment, most of the red light $L_R$ incident onto the combination of the red filter $CF_R$ and the green filter $CF_G$ is blocked by the combination of the green filter $CF_G$ and the red filter $CF_R$. Accordingly, when the first color filter layer 150 is red, the second color filter layer 161 is green, and the first converted light is red, the first converted light is blocked by a combination of a portion of the first color filter layer 150 and a portion of the second color filter layer 161 located between the first pixel area PA1 and the second pixel area PA2.

Figure 7:
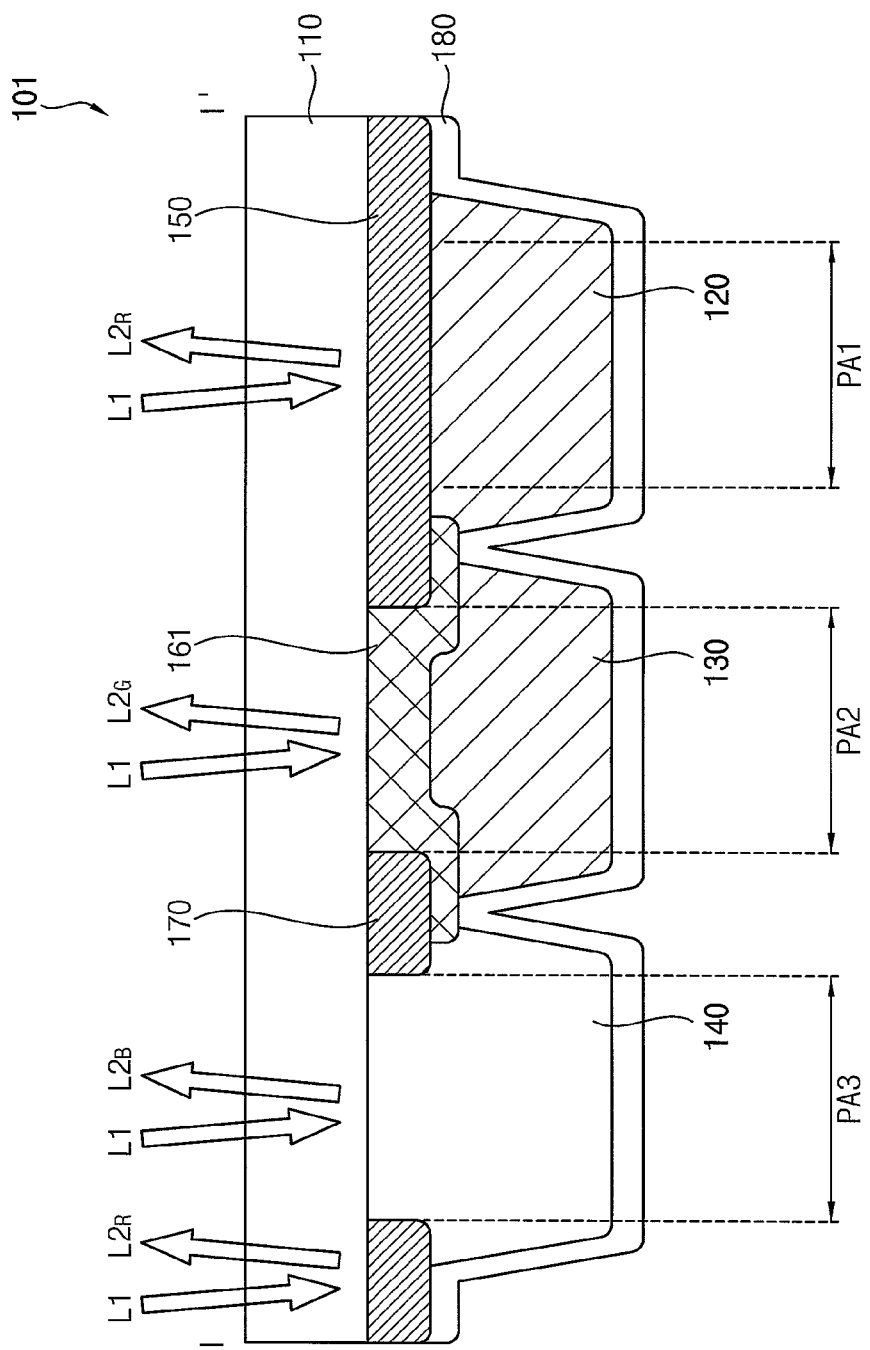
FIG. 7 is a cross-sectional view of light reflected by a color conversion panel in FIG. 5.

FIG. 7 is a cross-sectional view of light reflected by a color conversion panel 101 in FIG. 5.

Referring to FIG. 7, according to an embodiment, external light L is incident onto the color conversion panel 101. For example, the external light L1 is incident onto the color conversion panel 101 through the substrate 110. The external light L1 is reflected by the transmitting layer 140, the first color filter layer 150, the second color filter layer 161, and the light shielding layer 170.

According to an embodiment, when the external light L1 is reflected by the red first color filter layer 150 or the red light shielding layer 170, red reflective light $L2_R$ is emitted from the color conversion panel 101. When the external light L1 is reflected by the green second color filter layer 161, green reflective light $L2_G$, is emitted from the color conversion panel 101. Further, when the external light L1 is reflected by the transmitting layer 140, blue reflective light $L2_B$ is emitted from the color conversion panel 101. In this case, the combination of red reflective light $L2_R$, green reflective light $L2_G$, and blue reflective light $L2_R$ is emitted from the color conversion panel 101.

The color conversion panel 101 according to a present embodiment includes the red first color filter layer 150 and red the light shielding layer 170, and green second color filter layer 161. When external light is reflected by the color conversion panel 101, a combination of red, green and blue reflective light is emitted from the color conversion panel 101. In this case, the color conversion panel 101 is not visibly yellowish.

Figure 8:
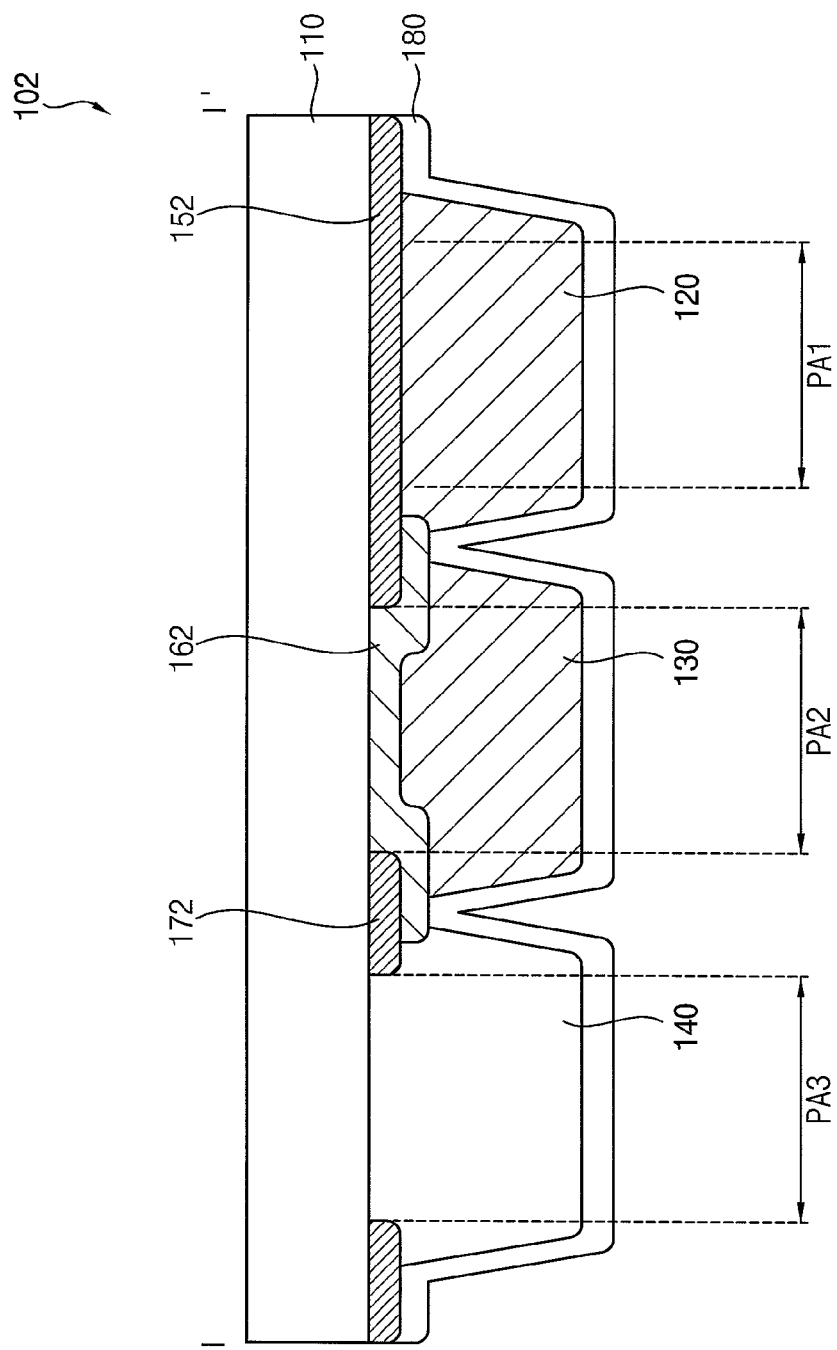
FIG. 8 is a cross-sectional view of a color conversion panel according to another embodiment.

FIG. 8 is a cross-sectional view of a color conversion panel according to an embodiment.

Referring to FIG. 8, a color conversion panel 102 according to an embodiment includes a substrate 110, a first color conversion layer 120, a second color conversion layer 130, a transmitting layer 140, a first color filter layer 152, a second color filter layer 162, a light shielding layer 172, and a capping layer 180. The color conversion panel 102 according to an embodiment described with reference to FIG. 8 is substantially similar to the color conversion panel 100 according to an embodiment described with reference to FIG. 2 except for the first color filter layer 152, the second color filter layer 162, and the light shielding layer 172. Accordingly, detailed descriptions of elements of the color conversion panel 102 according to an embodiment described with reference to FIG. 8 that are substantially similar to those of the color conversion panel 100 according to an embodiment described with reference to FIG. 2 will be omitted.

According to an embodiment, a thickness of the first color filter layer 152 is substantially the same as a thickness of the light shielding layer 172. Further, a thickness of the second color filter layer 162 is less than or substantially the same as the thickness of the first color filter layer 152.

In an embodiment, the thickness of the first color filter layer 152 ranges from about 15% to about 20% of a thickness of the transmitting layer 140. For example, the thickness of the transmitting layer 140 is about 6 μm. When the thickness of the first color filter layer 152 is less than about 15% of the thickness of the transmitting layer 140, the first color filter layer 152 does not sufficiently block incident light not converted by the first color conversion layer 120. Further, when the thickness of the first color filter layer 152 is greater than about 20% of the thickness of the transmitting layer 140, reflection of external light by the first color filter layer 152 increases, and the color conversion panel 102 is visibly reddish.

In an embodiment, the thickness of the first color filter layer 152 is less than or substantially the same as a thickness of the capping layer 180. For example, the thickness of the capping layer 180 is about 1.1 μm.

FIGS. 9A, 9B, 9C, and 9D are cross-sectional views that illustrate a method of manufacturing a color conversion panel according to an embodiment. For example, FIGS. 9A, 9B, 9C, and 9D illustrate a method of manufacturing the color conversion panel 100 according to an embodiment described with reference to FIG. 2. However, embodiments are not limited thereto, and can illustrate a method of manufacturing the color conversion panel 101 according to an embodiment described with reference to FIG. 5 or the color conversion panel 102 according to an embodiment described with reference to FIG. 8.

Figure 9A:
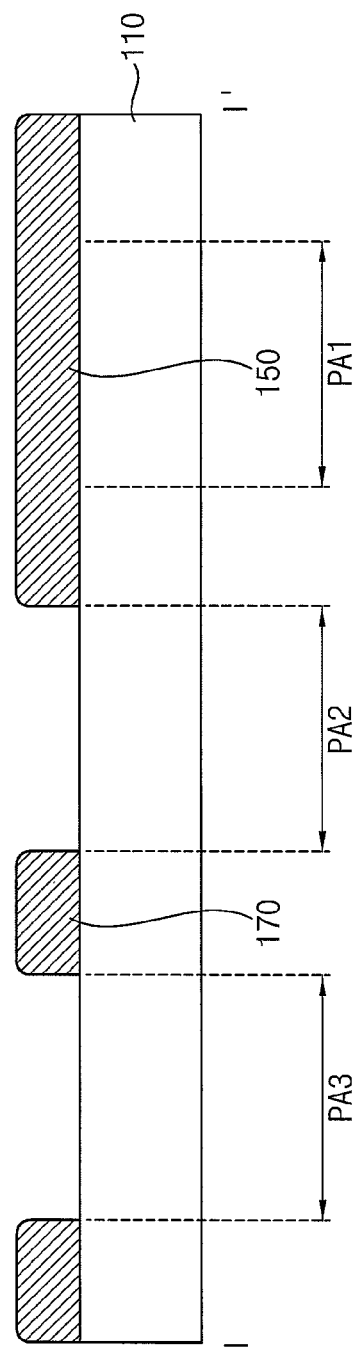

Referring to FIG. 9A, according to an embodiment, the first color filter layer 150 and the light shielding layer 170 are formed on the substrate 110. The first color filter layer 150 is formed on the substrate 110 in the first pixel area PA1. The first color filter layer 150 is further formed on the substrate 110 between the first pixel area PA1 and the second pixel area PA2. For example, the first color filter layer 150 is formed to substantially cover the first pixel area PA1 and a peripheral region of the first pixel area PA1 of the substrate 110. The first color filter layer 150 is formed of high molecular weight organic material that includes a first color pigment. For example, the first color is red.

According to an embodiment, the light shielding layer 170 is formed on the substrate 110 between the second pixel area PA2 and the third pixel area PA3. For example, the light shielding layer 170 is formed to substantially cover a peripheral region of the second pixel area PA2 and a peripheral region of the third pixel area PA3 of the substrate 110. The light shielding layer 170 is formed of high molecular weight organic material that includes a first color pigment.

According to an embodiment, the first color filter layer 150 and the light shielding layer 170 are formed substantially simultaneously. For example, an organic layer is formed of high molecular weight organic material that includes a first color pigment, and the organic layer is patterned by photolithography or a similar process to substantially simultaneously form the first color filter layer 150 and the light shielding layer 170. Accordingly, an additional process for forming the first color filter layer 150 is not required, and a manufacturing cost and a manufacturing time of the color conversion panel 100 can be reduced.

Figure 9B:
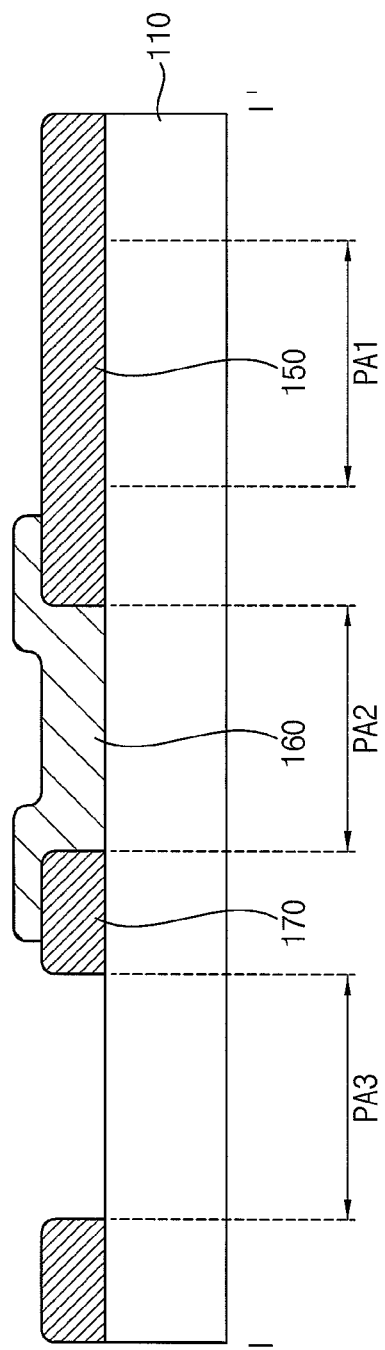

Referring to FIG. 9B, according to an embodiment, the second color filter layer 160 is formed on the substrate 110. The second color filter layer 160 is formed on the substrate 110 in the second pixel area PA2. The second color filter layer 160 is further formed on the first color filter layer 150 between the first pixel area PA1 and the second pixel area PA2 and on the light shielding layer 170 between the second pixel area PA2 and the third pixel area PA3. The second color filter layer 160 is formed of high molecular weight organic material that includes a second color pigment. For example, the second color is yellow.

Referring to FIG. 9C, according to an embodiment, the first color conversion layer 120, the second color conversion layer 130, and the transmitting layer 140 are formed on the substrate 110. The first color conversion layer 120 is formed on the first color filter layer 150, and includes a plurality of quantum dots that convert incident light into first color light. The second color conversion layer 130 is formed on the second color filter layer 160, and includes a plurality of quantum dots that convert incident light into third color light. Here, the third color differs from the first color and the second color. For example, the third color is green color. The transmitting layer 140 is formed on the substrate 110 in the third pixel area PA3. The transmitting layer 140 is formed of a dispersion material that transmits incident light.

Referring to FIG. 9D, according to an embodiment, the capping layer 180 is formed on the substrate 110. The capping layer 180 is formed on the first color conversion layer 120 and the second color conversion layer 130. For example, the capping layer 180 is formed to cover the first color conversion layer 120, the second color conversion layer 130, and the transmitting layer 140. The capping layer 180 transmits incident light, such as blue light, and may reflects first color light, such as red light, and third color light, such as green light.

Figure 10:
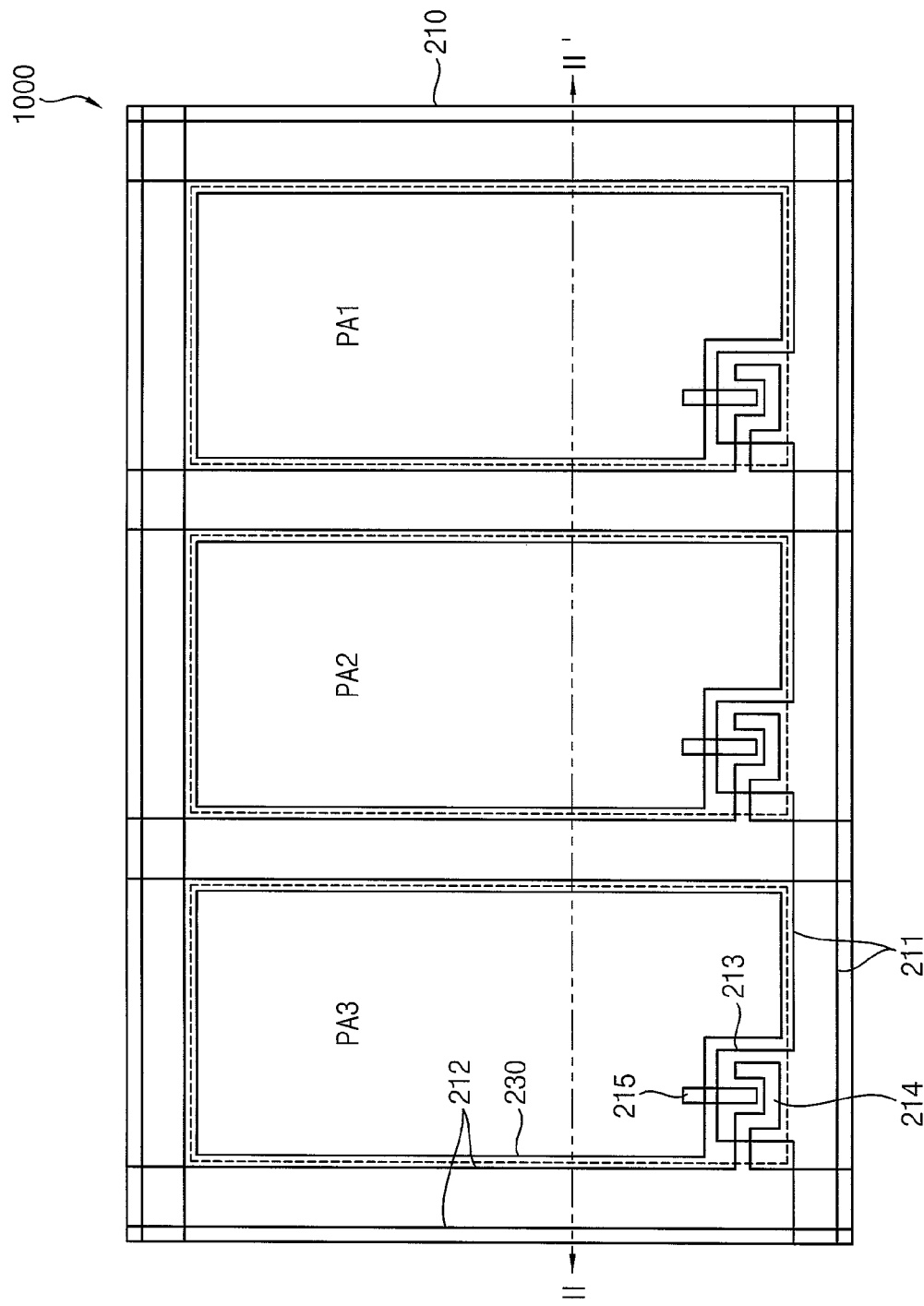
FIG. 10 is a plan view of a display device according to an embodiment.

FIG. 10 is a plan view of a display device according to an embodiment. FIG. 11 is a cross-sectional view of a display device in FIG. 10 cut along a line II-II'.

Referring to FIGS. 10 and 11, a display device 1000 according to an embodiment includes a color conversion panel 100, a liquid crystal panel 200, and a backlight unit 300.

According to an embodiment, the backlight unit 300 provides the liquid crystal panel 200 with light suitable for forming an image. The backlight unit 300 includes a light source that generates blue light $L_B$. The backlight unit 300 provides the generated blue light $L_B$ to the liquid crystal panel 200.

According to an embodiment, the liquid crystal panel 200 is disposed on the backlight unit 300. The liquid crystal panel 200 includes a transistor substrate 210, an opposite substrate 220, a pixel electrode 230, a common electrode 240, and a liquid crystal layer 250.

According to an embodiment, the transistor substrate 210 includes a plurality of transistors, and gate wirings 211 and data wirings 212 that transmit gate signals and data signals, respectively, to the transistors. Each of the transistors includes a semiconductor layer, a gate electrode 213 that protrudes from the gate wiring 211, a source electrode 214 that protrudes from the data wiring 212, and a drain electrode 215.

According to an embodiment, the opposite substrate 220 is opposite to the transistor substrate 210.

According to an embodiment, the pixel electrode 230 is disposed on a surface of the transistor substrate 210 that faces the opposite substrate 220. The pixel electrode 230 is patterned for each pixel. The pixel electrode 230 is connected to the drain electrode 215 of the transistor.

According to an embodiment, the common electrode 240 is disposed on a surface of the opposite substrate 220 that faces the transistor substrate 210. The common electrode 240 is commonly formed for all pixels.

According to an embodiment, the liquid crystal layer 250 is disposed between the transistor substrate 210 and the opposite substrate 220. The arrangement of liquid crystal molecules in the liquid crystal layer 250 can be controlled according to a voltage applied between the pixel electrode 230 and the common electrode 240. In other words, according to the voltage applied between the pixel electrode 230 and the common electrode 240, an area of the liquid crystal layer 250 between the pixel electrode 230 and the common electrode 240 is controlled between an on-mode, which changes a polarization of incident light, and an off-mode, in which polarization of incident light is not changed. Further, a degree of the changed polarization of incident light can be adjusted to output intermediate gradations.

According to an embodiment, the color conversion panel 100 is disposed on the liquid crystal panel 200. The color conversion panel 100 changes a wavelength of light emitted from the backlight unit 300 that passes through the liquid crystal panel 200, to form different colors. For example, the color conversion panel 100 converts blue light $L_B$ into red light $L_R$, green light $L_G$, or blue light $L_B$. The color conversion panel 100 according to a present embodiment may be any one of the color conversion panels 100, 101, and 102 described above, so that detailed descriptions thereof will be omitted.

According to an embodiment, the display device 1000 according to the present embodiment includes polarizers 410 and 420 on respective opposite surfaces of the liquid crystal panel 200. The first polarizer 410 and the second polarizer 420 polarize light that is received from the backlight unit 300 and are disposed on respective opposite sides of the liquid crystal panel 200.

According to an embodiment, each of the polarizers 410 and 420 is at least one of a coating polarizer or a wire grid polarizer. The polarizers 410 and 420 can be disposed on respective opposite sides of the liquid crystal panel 200 by various methods, such as a film method, a coating method, an adhering method, etc.

According to an embodiment, a planarization layer 500 is disposed between the color conversion panel 100 and the first polarizer 410. The first polarizer 410 is formed on the capping layer 180 of the color conversion panel 100, and the planarization layer 500 is formed before formation of the first polarizer 410. The planarization layer 500 provides a planar surface to the first polarizer 410.

The display device 1000 according to a present embodiment includes the color conversion panel 100 that includes the red first color filter layer 150 and red the light shielding layer 170. When external light is reflected by the display device 1000, a combination of red, blue and yellow (or green) reflective light is emitted from the display device 1000. In this case, the display device 1000 is not visibly yellowish.

A color conversion panel according to embodiments of the present disclosure can be incorporated into a display device included in a computer, a notebook, a mobile phone, a smartphone, a smart pad, a PMP, a PDA, an MP3 player, etc.

Although color conversion panels, display devices, and methods of manufacturing color conversion panels according to embodiments of the present disclosure have been described with reference to the drawings, the illustrated embodiments are examples, and may be modified and changed by a person having ordinary knowledge in the relevant technical field without departing from the technical spirit of the present disclosure described in the following claims.

What is claimed is:

1. A color conversion panel, comprising:
    a substrate that includes a first pixel area, a second pixel area, and a third pixel area;
    a first color conversion layer disposed on the substrate in the first pixel area, wherein the first color conversion layer includes a plurality of quantum dots that convert an incident light into a first color light having a first color;
    a second color conversion layer disposed on the substrate in the second pixel area, wherein the second color conversion layer includes a plurality of quantum dots that convert the incident light into a second color light having a second color;
    a first color filter layer disposed between the substrate and the first color conversion layer, wherein the first color filter layer has the first color and blocks incident light that is not converted by the first color conversion layer;
    a second color filter layer disposed between the substrate and the second color conversion layer, wherein the second color filter layer has a third color and blocks incident light that is not converted by the second color conversion layer;
    a light shielding layer disposed on the substrate between the second pixel area and the third pixel area, wherein the light shielding layer has the first color; and
    a capping layer disposed on the first color conversion layer and the second color conversion layer, wherein the capping layer extends between the first color conversion layer and the second color conversion layer and separates the first color conversion layer from the second color conversion layer, wherein the capping layer reflects first color light having the first color and second color light having the second color.

2. The color conversion panel of claim 1, wherein a portion of the first color filter layer is disposed on the substrate between the first pixel area and the second pixel area,
    wherein a first portion of the second color filter layer is disposed on the substrate between the first pixel area and the second pixel area, and
    wherein a second portion of the second color filter layer is disposed on the substrate between the second pixel area and the third pixel area.

3. The color conversion panel of claim 1, wherein the third color emitted from the second color filter layer differs from the second color emitted from the second color conversion layer.

4. The color conversion panel of claim 1, wherein the third color emitted from the second color filter layer is the same as the second color emitted from the second color conversion layer.

5. The color conversion panel of claim 1, wherein the first color is red, the second color is green, and the third color is one of yellow or green.

6. The color conversion panel of claim 1, wherein a thickness of the first color filter layer is the same as a thickness of the light shielding layer.

7. The color conversion panel of claim 1, further comprising a transmitting layer disposed on the substrate in the third pixel area, wherein the transmitting layer transmits the incident light.

8. The color conversion panel of claim 7, wherein a thickness of the first color filter layer ranges from 20% to 30% of a thickness of the transmitting layer for sufficiently blocking incident light not converted by the first color conversion layer and reducing reflection of external light by the first color layer to prevent the color conversion panel becoming visibly reddish.

9. The color conversion panel of claim 7, wherein a thickness of the first color filter layer ranges from 15% to 20% of a thickness of the transmitting layer for sufficiently blocking incident light not converted by the first color conversion layer and reducing reflection of external light by the first color layer to prevent the color conversion panel becoming visibly reddish.

10. The color conversion panel of claim 1, further comprising
a backlight unit that emits the incident light; and
a liquid crystal panel disposed on the backlight unit,
wherein the color conversion panel is disposed on the liquid crystal panel, and
the incident light emitted by the backlight unit is blue.

11. A color conversion panel, comprising:
a substrate that includes a first pixel area, a second pixel area, and a third pixel area;
a first color conversion layer disposed on the substrate in the first pixel area, wherein the first color conversion layer includes a plurality of quantum dots that convert an incident light into a first color light having a first color;
a second color conversion layer disposed on the substrate in the second pixel area, wherein the second color conversion layer includes a plurality of quantum dots that convert the incident light into a second color light having a second color;
a first color filter layer disposed between the substrate and the first color conversion layer, wherein the first color filter layer has the first color and blocks incident light that is not converted by the first color conversion layer;
a second color filter layer disposed between the substrate and the second color conversion layer, wherein the second color filter layer has a third color and blocks incident light that is not converted by the second color conversion layer;
a transmitting layer disposed on the substrate in the third pixel area, wherein the transmitting layer transmits the incident light; and
a capping layer disposed on the first color conversion layer and the second color conversion layer, wherein the capping layer extends between the first color conversion layer and the second color conversion layer and separates the first color conversion layer from the second color conversion layer, wherein the capping layer reflects first color light and second color light.

12. The color conversion panel of claim 11, further comprising:
a light shielding layer disposed on the substrate between the second pixel area and the third pixel area, wherein the light shielding layer has the first color, wherein a thickness of the first color filter layer is the same as a thickness of the light shielding layer.

13. The color conversion panel of claim 11,
wherein a portion of the first color filter layer is disposed on the substrate between the first pixel area and the second pixel area,
wherein a first portion of the second color filter layer is disposed on the substrate between the first pixel area and the second pixel area, and
wherein a second portion of the second color filter layer is disposed on the substrate between the second pixel area and the third pixel area.

14. The color conversion panel of claim 11, wherein:
the first color is red, the second color is green, and the third color is one of green or yellow.

15. The color conversion panel of claim 11, wherein a thickness of the first color filter layer is less than 30% of a thickness of the transmitting layer for sufficiently blocking incident light not converted by the first color conversion layer and reducing reflection of external light by the first color layer to prevent the color conversion panel becoming visibly reddish.

16. A method of manufacturing a color conversion panel, the method comprising:
forming a first color filter layer on a substrate in a first pixel area, the first color filter layer having a first color;
forming a light shielding layer on the substrate between a second pixel area and a third pixel area, the light shielding layer having the first color;
forming a second color filter layer on the substrate in the second pixel area, the second color filter layer having a second color;
forming a first color conversion layer on the first color filter layer, wherein the first color conversion layer includes a plurality of quantum dots that convert an incident light into a first color light;
forming a second color conversion layer on the second color filter layer, wherein the second color conversion layer includes a plurality of quantum dots that convert the incident light into a third color light;
forming a transmitting layer on the substrate in the third pixel area, wherein the transmitting layer transmits the incident light; and
forming a capping layer on the first color conversion layer and the second color conversion layer, wherein the capping layer extends between the first color conversion layer and the second color conversion layer and separates the first color conversion layer from the second color conversion layer, wherein the capping layer reflects first color light and second color light.

17. The method of claim 16, wherein the first color filter layer and the light shielding layer are simultaneously formed.

\* \* \* \* \*